(12) United States Patent
Singh et al.

(10) Patent No.: US 6,947,639 B2
(45) Date of Patent: Sep. 20, 2005

(54) INTEGRATED POLARIZATION COUPLER

(75) Inventors: Harmeet Singh, Acton, MA (US); Hamid R. Khazaei, Westford, MA (US)

(73) Assignee: OpteVia Corporation, Acton, MA (US)

( * ) Notice: Subject to any disclaimer, the term of this patent is extended or adjusted under 35 U.S.C. 154(b) by 236 days.

(21) Appl. No.: 10/298,465

(22) Filed: Nov. 18, 2002

(65) Prior Publication Data

US 2004/0096155 A1 May 20, 2004

(51) Int. Cl.$^7$ .............................................. G02B 6/34
(52) U.S. Cl. ......................................................... 385/37
(58) Field of Search ............................................ 385/37

(56) References Cited

U.S. PATENT DOCUMENTS

| | | | |
|---|---|---|---|
| 4,792,207 A | * 12/1988 | Shaw et al. | 385/28 |
| 4,793,676 A | * 12/1988 | Risk | 385/1 |
| 5,056,883 A | 10/1991 | Diemeer et al. | |
| 5,111,517 A | 5/1992 | Riviere | |
| 5,133,029 A | 7/1992 | Baran et al. | |
| 5,475,771 A | 12/1995 | Hosoi | |
| 5,515,461 A | 5/1996 | Deri et al. | |
| 6,175,668 B1 | 1/2001 | Borrelli et al. | |
| 6,324,312 B1 | 11/2001 | Liao et al. | |

OTHER PUBLICATIONS

J.J.G.M. van der Tol et al., "A short polarization splitter without metal overlays on InGaAsP–InP," IEEE Photonics Technology Letters, vol. 9, pp. 209–211 (1997).

P. Albrecht et al., "TE/TM mode splitters on InGaAsP/IP," IEEE Photonics Technology Letters, vol. 2, pp. 114–116 (1990).

C. Edge et al., "Passive integrated optical polarization mode–splitter in lithium niobate employing a resonant metal–loaded structure," Electron. Lett., vol. 26, pp. 1855–1856, (1990).

A.N. Miliou et al., "A 1 $\mu$m directional coupler polarization splitter by ion exchange," J. Lightwave Technology, vol. 11, pp. 220–225 (1993).

L.B. Soldano et al., "Mach–Zehnder interferometer polarization splitter in InGaAsP/InP," IEEE Photonics Technology Letters. vol. 6, pp. 402–404 (1994).

J.J.G.M. van der Tol et al., "A polarization splitter on LiNbO$_3$ using only Titanium diffusion," J. of Lightwave Technology, vol. 9, pp. 879–226 (1991).

J.J.G.M. van der Tol et al., "Mode evolution type polarization splitter on InGaAsP/InP," IEEE Photonics Technology Letters, vol. 5, pp. 1412–1414 (1993).

J.E. Baran et al., "Adiabatic 2x2 polarization splitter on LiNbO$_3$." IEEE Photonics Letters, vol. 4, pp. 39–41 (1992).

Y.P. Liao et al., "Passive Ni: LiNbO$_3$ polarization splitter at 1.3 $\mu$m wavelength," vol. 32, pp. 1003–1005 (1996).

* cited by examiner

*Primary Examiner*—Mark Tremblay
(74) *Attorney, Agent, or Firm*—Fish & Richardson P.C.

(57) ABSTRACT

A polarization coupler includes a stress-inducing feature disposed to generate a stress-field in a substrate. First and second waveguides each have a coupling portion that pass through the stress-field. First and second periodic-structures are in optical communication with the coupling portions of the first and second waveguides.

25 Claims, 8 Drawing Sheets

US 6,947,639 B2

INTEGRATED POLARIZATION COUPLER

BACKGROUND

The invention relates to integrated optical devices, and in particular, to polarization couplers.

A known method for amplifying an optical signal beam propagating in a waveguide is to pass a pump beam through the same waveguide. In this method, known in the art as "Raman amplification," the pump beam transfers energy to phonons within the waveguide. If the wavelength of the pump beam is correctly chosen, the energy in these phonons is transferred to the signal beam, thus amplifying the optical signal.

In most cases, the optical signal occupies a band of wavelengths. A single pump beam can only amplify a limited portion of the entire band occupied by the optical signal. As a result, it is often necessary to combine several pump beams, each at a slightly different wavelength, to provide amplification over the entire band occupied by the optical signal.

The extent to which a pump beam amplifies the signal beam also depends on the polarization difference between the pump beam and the signal beam. The pump beam, having been generated by a nearby laser, is typically linearly polarized. The signal beam, having been generated far away, has become thoroughly depolarized. As a result, the amplification of the signal beam will depend on whether the linearly-polarized pump beam and the randomly polarized signal beam happen to share the same polarization.

SUMMARY

In one aspect, the invention includes a polarization coupler in which a stress-inducing feature is disposed to generate a stress-field in a substrate. First and second waveguides, each having a coupling portion, pass through the stress-field. First and second periodic-structures are in optical communication with the coupling portions of the first and second waveguides.

In one embodiment, the first periodic-structure includes a grating. This grating can be a short-period grating or a long-period grating.

The first and second periodic-structures are either aligned with each other or are offset from one another. The offset between the first and second periodic-structures can be along the axial dimension of the waveguide or a transverse dimension.

One example of a stress-inducing feature is a stress-inducing strip disposed on the surface of the substrate. Such a stress-inducing strip can be placed above the first waveguide or it can extend across the first and second waveguides. One way to generate a stress-field is to select a strip material having a coefficient of thermal expansion that differs from a coefficient of thermal expansion of the substrate.

The first and second waveguides have first and second cross-sections respectively. In some embodiments, the first and second cross-sections are the same. However, the invention also includes those embodiments in which the first and second cross-sections are different from each other.

In another aspect, the invention includes an integrated optical circuit on a substrate having a birefringent portion. First and second waveguides having respective first-waveguide and second-waveguide coupling sections pass through the birefringent portion. A first-waveguide periodic-structure is in optical communication with the first-waveguide coupling-portion and a second-waveguide periodic-structure is in optical communication with the second-waveguide coupling-portion.

Another aspect of the invention is a method for combining a first light wave having a first polarization and a second light wave having a second polarization. The method includes inducing a stress field in a substrate and guiding the first and second light waves through the stress field in respective first and second waveguides. The first and second waveguides each have a coupling portion in optical communication with a corresponding periodic-structure.

The polarization coupler can be integrated into a substrate and can therefore be easily manufactured using conventional process steps.

These and other features and advantages of the invention will be apparent from the following detailed description and the accompanying figures, in which:

DETAILED DESCRIPTION

Figure 1:
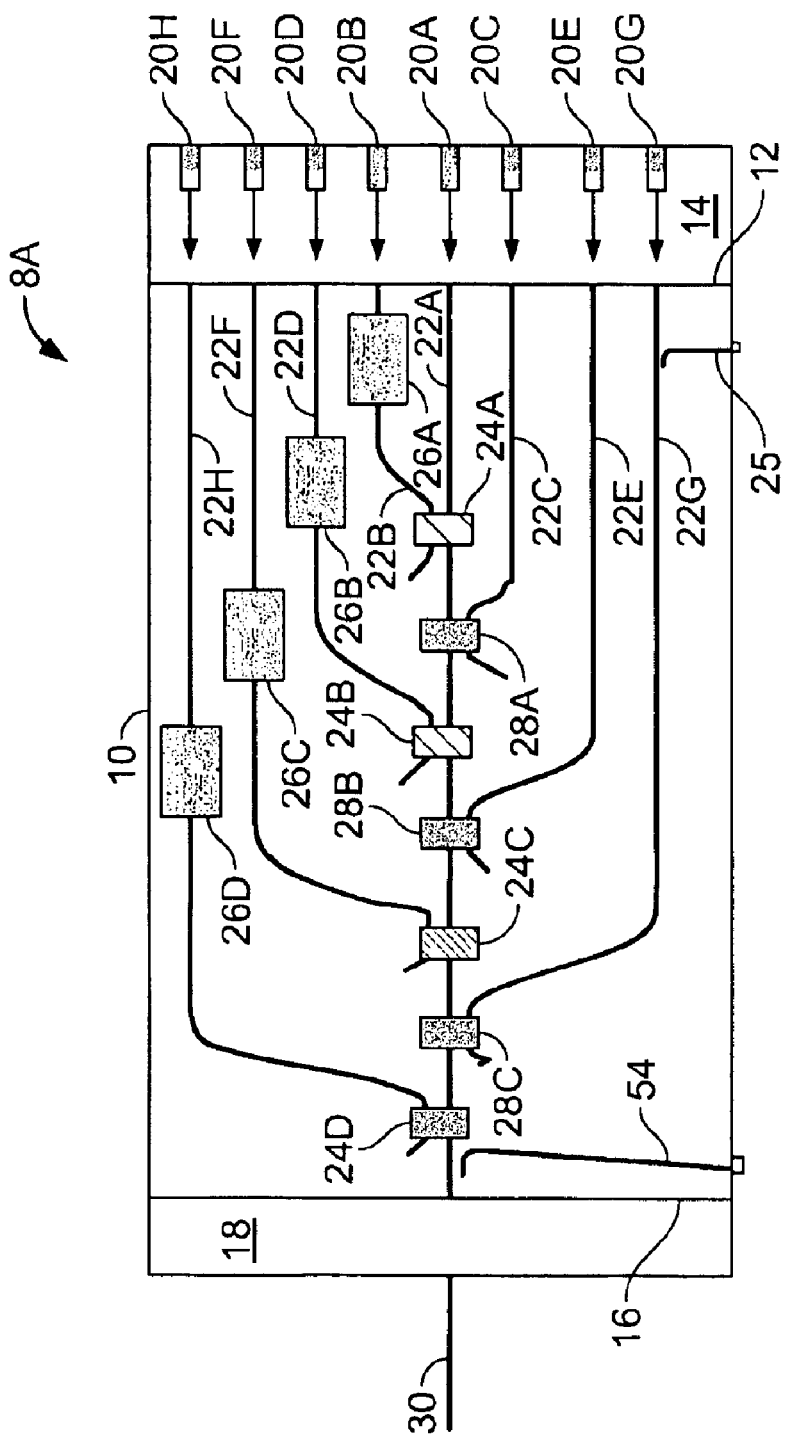
FIGS. 1–4 show embodiments of a wavelength polarization multiplexer.

FIG. 1 shows a first embodiment 8A of an optical multiplexer that combines several beams having different wavelengths and polarizations into one output beam. The first embodiment 8A includes a planar substrate 10 having an input 12 adjoining an input coupling region 14 and an output 16 adjoining an output coupling region 18. A plurality of laser diode pairs 20A–B, 20C–D, 20E–F, 20G–H couple their light energy to corresponding inputs in the input coupling region 14. For instance, first and second laser diodes 20A–B, which emit light at the same wavelength with the same polarization (herein referred to as the "principal polarization"), pass first and second beams into the input coupling region 14.

Each laser diode pair 20A–B emits light at a wavelength that differs from the wavelengths emitted by other laser diode pairs 20C–D, 20E–F, 20G–H. The number of laser diode pairs, and hence the number of wavelengths propagating within the optical multiplexer, can be varied to suit the application of the optical multiplexer.

The first beam is coupled into a first waveguide 22A that extends from the input 12 to the output face 16. The second beam is coupled into a second waveguide 22B that extends from the input 12 to a first polarization coupler 24A proximate to the first waveguide 22A. The first and second beams are coupled to the respective first and second waveguides 22A, 22B by a lens coupling system (not shown).

The currents driving each laser diode 20A–H are controlled by an external control circuit (not shown). The control circuit provides selected currents to the respective laser diodes 20A–H to achieve gain flattening across the laser diodes 20A–H. In doing so, the control circuit relies, to some extent, on a feedback signal indicative of the power output of a particular laser diode. For a particular laser diode 20G, a feedback signal can be obtained by providing a tap 25 that extracts, from a waveguide 22G, a portion of the energy delivered to that waveguide 22G by its associated laser diode 20G.

Between the input 12 and the first polarization coupler 24A, the second waveguide 22B passes through a first polarization rotator 26A that is integral with the substrate 10. As used herein, "polarization rotator" refers to a two-port device that rotates the polarization of light passing therethrough by a selected angle. Typically, this angle is an odd multiple of ninety degrees, in which case the polarization rotator 26A transforms a principally polarized beam at its input into an orthogonally polarized beam at its output.

The first and second laser diodes 20A–B are identical in structure and configuration. As a result, the first and second beams are both principally polarized. After passing through the first polarization rotator 26A, the second beam, which is now orthogonally polarized relative to the first beam, proceeds to the first polarization coupler 24A. At the first polarization coupler 24A, the orthogonally polarized second beam is added to the principally polarized first beam already propagating on the first waveguide 22A.

As used herein, "polarization coupler" refers to a four-port device integrated into the substrate 10 that combines orthogonally polarized beams presented at its first and second input ports and provides the resulting combined beam at a first output port. A second output port of the polarization coupler terminates in the substrate 10.

Third and fourth beams from respective third and fourth laser diodes 20C–D, both of which emit light at a second wavelength, are coupled to third and fourth waveguides 22C–D in the same manner described above in connection with the first and second laser diodes 20A–B. The third waveguide 22C extends from the input 12 to a first wavelength coupler 28A proximate to the first waveguide 22A.

As used herein, "wavelength coupler" refers to a four-port device integrated into the substrate 10 that combines beams of different wavelengths present at its first and second input ports and provides the resulting combined beam at a first output port. A second output port of the wavelength coupler terminates in the substrate 10. The use of wavelength specific coupling devices, such as a wavelength coupler, avoids the possibility that beams of other wavelengths that are already propagating on the first waveguide 22A will leak out through a coupler each time an additional beam is placed on the first waveguide 22A.

At the first wavelength coupler 24A, the third beam is combined with the first and second beams already propagating on the first waveguide 22A. The fourth waveguide 22D extends from the input 12, through a second polarization rotator 26B, to a second polarization coupler 24B, as described above in connection with the second waveguide 22B. As a result, the fourth beam, which has a polarization orthogonal to the third beam, is also combined with the beams already propagating on the first waveguide 22A. Thus, at the output of the second polarization coupler 24B, the first waveguide 22A now carries orthogonally polarized beams at the first wavelength and orthogonally polarized beams at the second wavelength.

The foregoing pattern continues, with fifth and sixth laser diodes 20E–F emitting fifth and sixth beams at a third wavelength and seventh and eighth laser diodes 20G–H emitting seventh and eighth beams at a fourth wavelength. The fifth and seventh beams are guided to second and third wavelength couplers 28B–C by fifth and seventh waveguides 22E, 22G. The fifth and seventh beams are thus added, with their principal polarizations intact, to the beams already propagating in the first waveguide 22A.

Meanwhile, the sixth and eight beams emitted by sixth and eighth laser diodes 20F, 20H are coupled to sixth and eight waveguides 22F, 22H. The sixth and eighth waveguides 22F, 22H guide the sixth and eight beams through third and fourth polarization rotators 26C–D and on to third and fourth polarization couplers 24C–D. The third and fourth polarization couplers 24C–D add the sixth and eighth beams, which have now had their polarizations rotated, to the beams that are already propagating on the first waveguide 22A.

The first waveguide 22A extends to the output face 16 of the substrate 10, carrying with it all eight constituent components collected as it traversed the substrate 10 from the input 12 to the output 14. This beam is coupled, across the coupling region 18, into an output waveguide 30.

There are additional ways to arrange polarization rotators, wavelength couplers, and polarization couplers on the substrate 10 to achieve the same result as that illustrated in FIG. 1.

Figure 2:
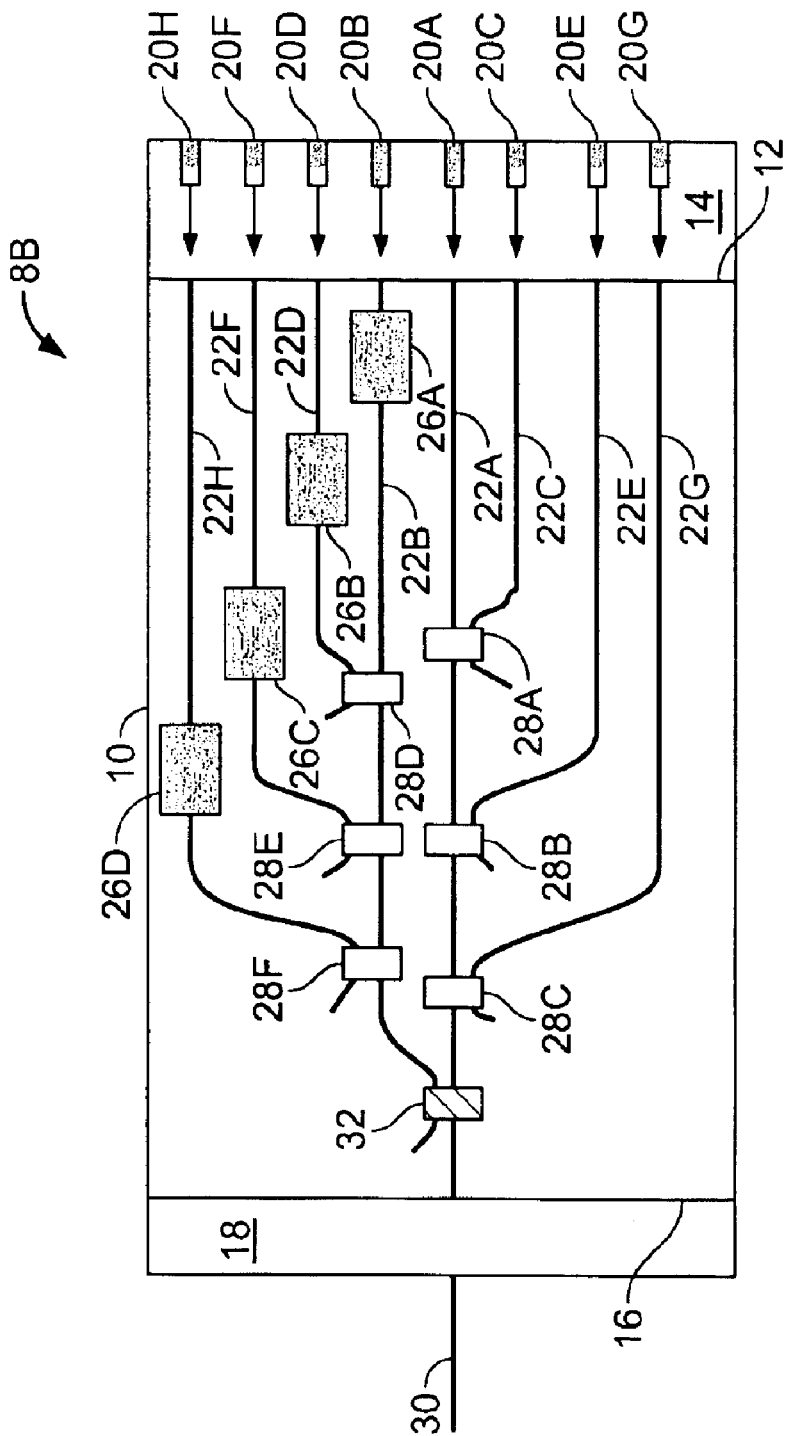

FIG. 2 shows a second embodiment 8B embodiment for an optical multiplexer. In this second embodiment 8B, the second waveguide 22B collects all four orthogonally polarized beams, which are at four different wavelengths and directs them to a broadband polarization coupler 32. The broadband polarization coupler 32 combines these four orthogonally polarized beams with the four principally polarized beams already propagating on the first waveguide 22A.

In the second embodiment 8B, the first waveguide 22A passes through first, second, and third wavelength couplers 28A–C. These wavelength couplers 28A–C add the third, fifth, and seventh beams, all of which are principally polarized, to the first beam (also principally polarized) already propagating on the first waveguide 22A. Similarly, the second waveguide 22B passes through three different wavelength couplers 28D–F. At each of the wavelength couplers the second waveguide 22B collects a beam of a different wavelength whose polarization has been rotated by a polarization rotator 26A–D. The second waveguide 22B carries its collected orthogonally polarized beams into the broadband polarization coupler 32. The broadband polarization coupler 32 couples the orthogonally polarized light to the first waveguide 22A. The second embodiment 8B shown in FIG. 2 thus requires only one, albeit broadband, polarization coupler 32 rather than the four narrowband polarization couplers 24A–D shown in FIG. 1.

Figure 3:
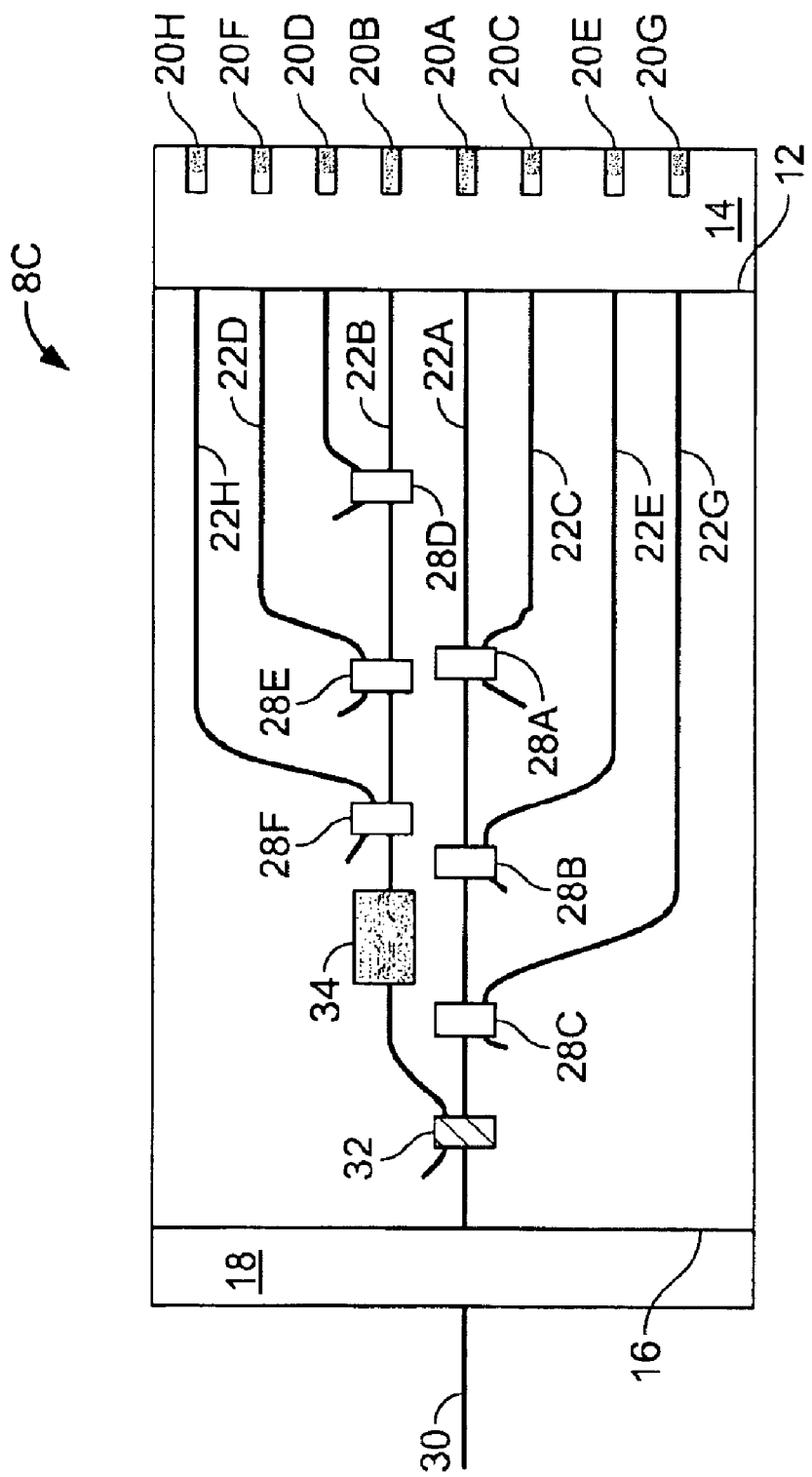

FIG. 3 shows a third embodiment 8C similar to the second embodiment 8B shown in FIG. 2, the principal difference being that the beams collected by the second waveguide 22B at each wavelength coupler 28D–F retain their principal polarization. The second waveguide 22B brings these collected beams, all of which are at different wavelengths, to a broadband polarization rotator 34. At the broadband polarization rotator 34, the polarizations of the collected beams are all rotated together. The second waveguide 22B directs the now orthogonally polarized beams to the broadband polarization coupler 32, which places then all at once into the first waveguide 22A. Like the embodiment of FIG. 2, the embodiment shown in FIG. 3 requires only a single polarization coupler 32. However, it also requires only a single, albeit broadband, polarization rotator 34 instead of the four narrowband polarization rotators 26A–D shown in FIGS. 1 and 2.

Figure 4:
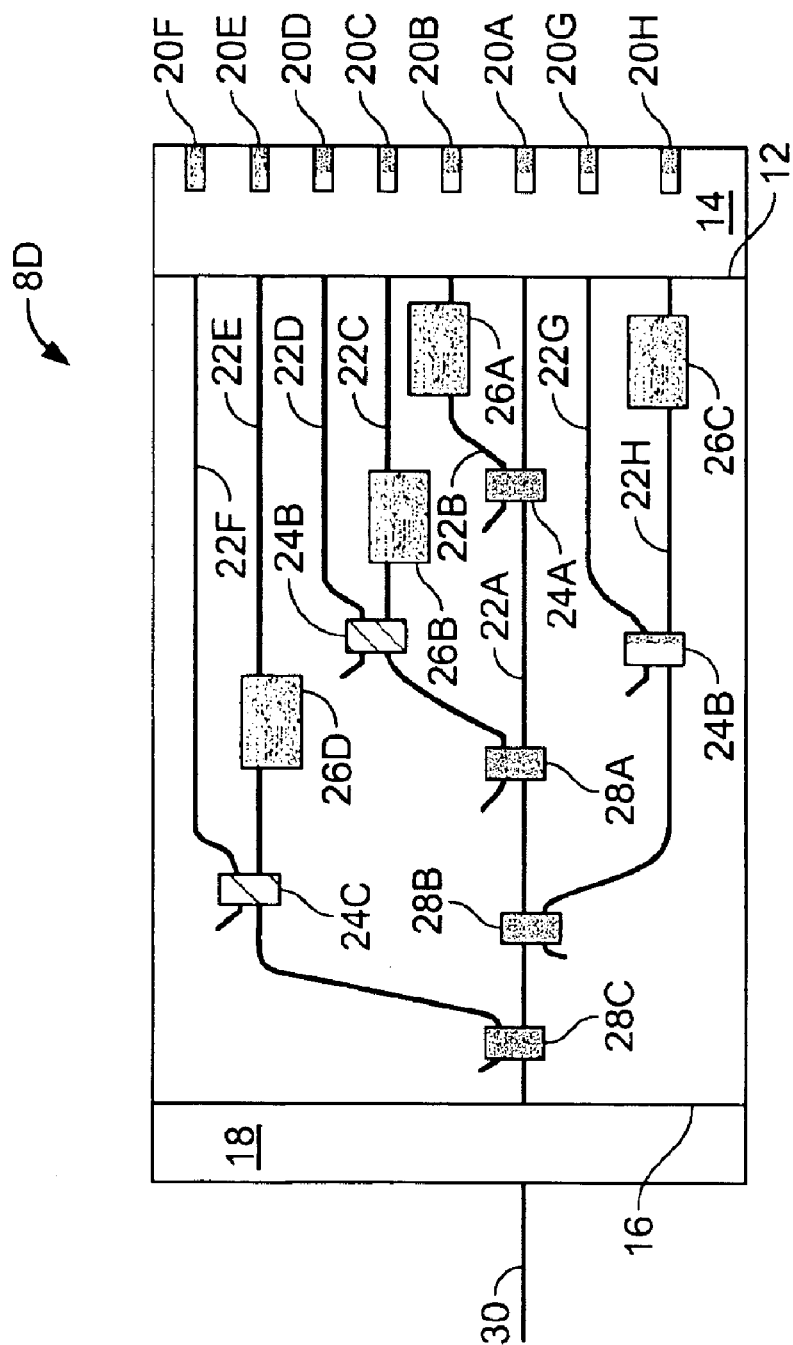

FIG. 4 shows a fourth embodiment 8D that, like the first embodiment 8A, relies on four narrowband polarization rotators and four narrowband polarization couplers. In this fourth embodiment 8D, the principally polarized beams and the orthogonally polarized beams at each wavelength are combined before being placed on a first waveguide 22A.

In FIG. 4, first and second beams from the first and second laser diodes 20A–B are coupled across the coupling region 14 to the first and second waveguides 22A–B. The second waveguide 22B directs the second beam through a first polarization rotator 26A and on to a first polarization coupler 24A. The second beam, which is now orthogonally polarized, is added to the first beam already propagating on the first waveguide 22A.

Principally polarized beams of the same wavelength, provided by third and fourth laser diodes 20C–D, are coupled to third and fourth waveguides 22C–D in the same way. The fourth waveguide 22D directs the fourth beam to a second polarization coupler 24B. The third waveguide 22C directs the third beam through a second polarization rotator 26B, which rotates it into a orthogonally polarized beam and guides it to the second polarization coupler 24B. The second polarization coupler 24B adds the fourth beam to the now orthogonally polarized third beam already propagating on the third waveguide 22C. The combination of the principally polarized beams and the orthogonally polarized beams, both of which have the same wavelength, is then added to the first waveguide 22A by a first narrow-band wavelength coupler 28A.

The foregoing procedure is repeated for additional pairs of laser diodes 20E–F, 20G–H. One 20E, 20H of each pair of laser diodes is coupled, by a waveguide 22E, 22H, to a polarization rotator 26C–D and the other 20F–G is coupled, by another waveguide 22F–G, to a polarization coupler 24B–C. The polarization rotator 26C–D is coupled to the polarization coupler 24B–C by the waveguide 22H, 22E.

Figure 5:
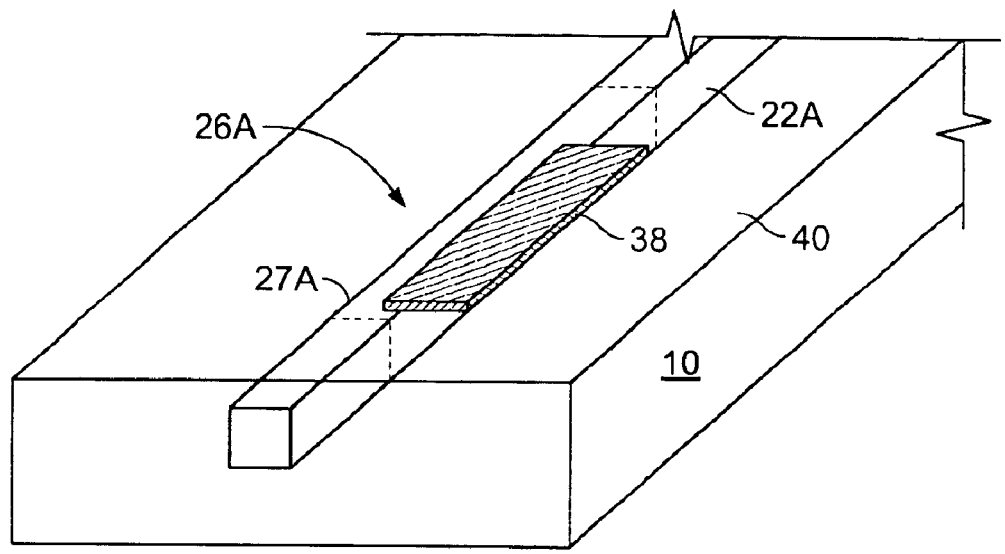
FIGS. 5–6 show a polarization rotator used in one of the wavelength polarization multiplexers of FIGS. 1–4.
Figure 6:
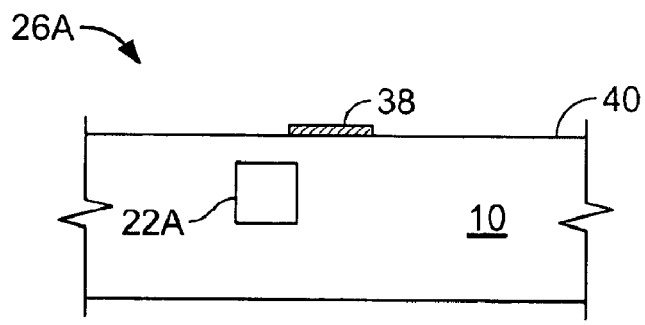

FIGS. 5 and 6 show an exemplary polarization rotator 26A that changes the polarization state of a beam by passing that beam through a birefringent portion 27A of a waveguide 22A. The birefringent portion 27A has a principal axis that is rotated relative to the polarization vector of light provided by the laser 20A feeding that waveguide 22A. In the illustrated polarization rotator 26A, rotation of the principal axis is induced by creating a local stress field in the birefringent portion 27A or by locally perturbing a uniform stress field in the birefringent portion 27A. In either case, the direction of the local stress field is offset from the direction of the polarization vector, thereby causing the principal axis within the birefringent portion 27A to be neither parallel nor perpendicular to the polarization vector.

In operation, linearly polarized light from a laser 20A propagates on the waveguide 22A toward the birefringent portion 27A thereof. Once this light reaches the birefringent portion 27A, the polarization vector resolves into a first component that is parallel to the principal axis and a second component that is orthogonal to the principal axis. The first and second components then propagate at different velocities. As they do so, the polarization vector begins to rotate. Once the light leaves the birefringent portion 27A of the waveguide 22A, these two components propagate at the same velocity, thereby freezing the rotation of the polarization vector. By properly selecting the length of the birefringent portion 27A and the angle of the principal axis relative to the polarization vector of incoming light, one can freeze the orientation of the polarization vector at any desired angle.

Various structures can be used to cause the desired stress field in the birefringent portion 27A of the waveguide 22A. One such structure is a stress-applying strip 38 on the surface 40 of the substrate 10. The stress-applying strip 38 is made of a material having a coefficient of thermal expansion that is different from that of the underlying substrate 10. For example, if the substrate 10 is glass, the strip 38 can be silicon or metal. Suitable materials for use in a strip include materials having a high coefficient of thermal expansion, such as metals, glass compositions having a high coefficient of thermal expansions, such as boron doped silica, and polymers having a high coefficient of thermal expansion.

The strip 38 is deposited onto the surface 40 in a high-temperature process, during which both the substrate 10 and the strip 38 are in an expanded state. When the substrate 10 and strip 38 cool, they contract by different amounts. Because the strip 38 is physically attached to the substrate 10, this results in a stress field near the strip 38. This stress field changes the optical properties of structures in regions of the substrate 10 near the strip 38.

Stress applied to the substrate 10 causes a shifting of the atomic positions and electron cloud distributions within the substrate 10. An electromagnetic wave sees these two effects cumulatively as a change in the index of refraction. Because the stress is not equal in all directions, waves having different polarizations experience different indices of refraction. The distribution of the induced stress in the substrate 10 is calculated by finite element modeling using known constitutive relations between stress and the rotation of the principal axis in response to that stress. The extent of this rotation depends on the change in the index of refraction in each direction. A relationship between the induced stress and the change in the index of refraction is given by:

$$\begin{Bmatrix} \Delta n_{xx} \\ \Delta n_{yy} \\ \Delta n_{zz} \\ \Delta n_{xy} \\ \Delta n_{xz} \\ \Delta n_{yz} \end{Bmatrix} = - \begin{bmatrix} B_{11} & B_{12} & B_{12} & 0 & 0 & 0 \\ B_{12} & B_{11} & B_{12} & 0 & 0 & 0 \\ B_{12} & B_{12} & B_{11} & 0 & 0 & 0 \\ 0 & 0 & 0 & B_{44} & 0 & 0 \\ 0 & 0 & 0 & 0 & B_{44} & 0 \\ 0 & 0 & 0 & 0 & 0 & B_{44} \end{bmatrix} \cdot \begin{Bmatrix} \sigma_{xx} \\ \sigma_{yy} \\ \sigma_{zz} \\ \tau_{xy} \\ \tau_{xz} \\ \tau_{yz} \end{Bmatrix}$$

where $\Delta n_{ij}$ is the change in the index of refraction from its stress-free value in the Cartesian directions i and j, B is the stress-optic tensor, which is a measured material constant, and $\sigma_{ij}$ and $\tau_{ij}$ are the stresses and torsions in the Cartesian directions.

As shown in FIG. 5, the strip 38 is deposited proximate to, but not directly above, the waveguide 22A, with the longitudinal direction of the strip 38 being parallel to the longitudinal axis of the waveguide 22A. The waveguide 22A passes through the stress-field generated by the strip 38. The direction of the stress-field through which the waveguide 22A passes is selected to cause a portion of the waveguide 22A to become a birefringent portion 27A having a principal axis that is offset from the polarization vector of light that is to feed that waveguide 22A. The extent of this stress-induced birefringence, and the direction of the resulting principal axis, depends on the differences between the coefficients of thermal expansion of the substrate 10 and the strip 38, as well as on the position of the waveguide 22A relative to the strip 38.

The length of the strip 38 is selected to rotate the polarization of a beam propagating on the waveguide 22A by the desired angle. This dimension thus depends on the extent of the stress-induced birefringence within the waveguide 22A. For example, if the birefringence is such that the principal and orthogonal axes within the birefringent portion 27A of the waveguide 22A are rotated by 45 degrees relative to the polarization vector, then a strip 38 that is approximately a quarter-wavelength long will provide a ninety degree rotation of the beam's polarization. One formula that relates the length of the strip to the extent of the birefringence is:

$$\frac{\lambda}{2L} = \delta n$$

where λ is the wavelength of interest, L is the length of the strip, and δn is the difference between the indices of refraction of the principal and orthogonal axes. For a given geometry, the indices of refraction can be obtained by finite-element modeling to obtain the stress distribution within the substrate 10, and by application of the stress-optic tensor to relate the stress distribution thus calculated to the optical properties of the substrate 10.

Figure 7:
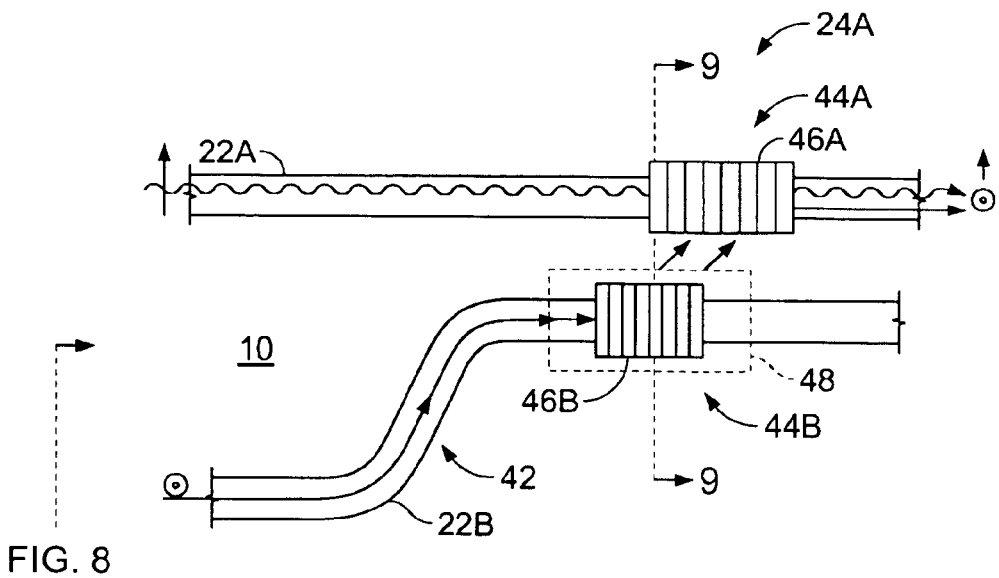
FIGS. 7–9 show plan, perspective and cross-sectional views respectively of a polarization coupler that can be used in any of the wavelength polarization multiplexers of FIGS. 1–4.
Figure 8:
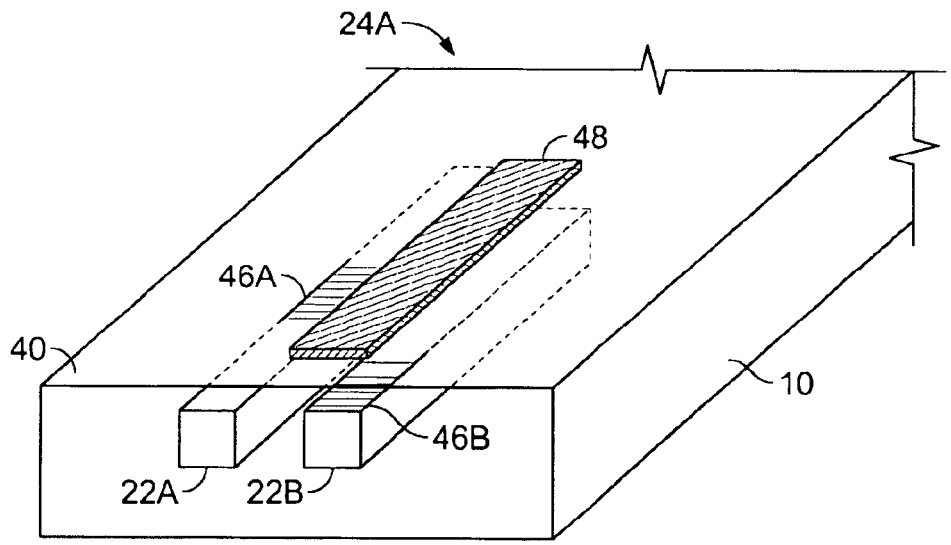
Figure 9:
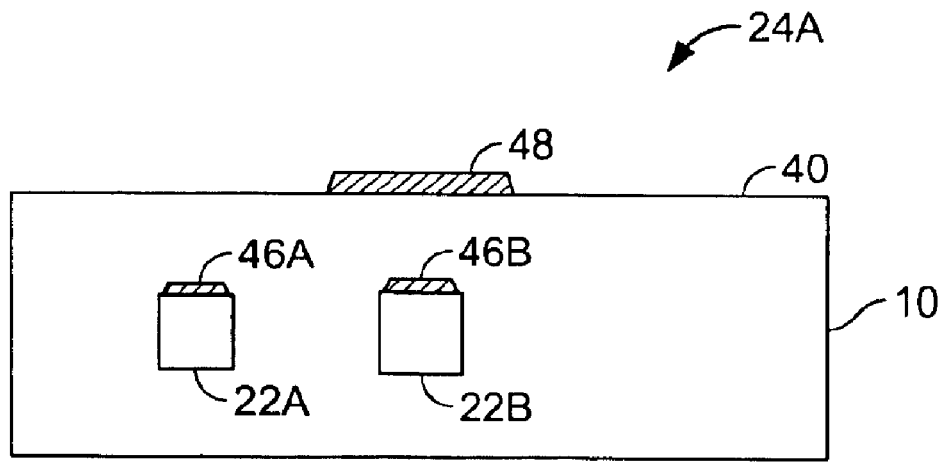

An exemplary polarization coupler 24A, shown in FIGS. 7–9, couples an orthogonally polarized beam propagating in an incoming waveguide (which in this case is the second waveguide 22B) to a principally polarized beam already propagating in an identical through waveguide (which in this case is the first waveguide 22A). The polarization coupler 24A couples the orthogonally polarized beam while preventing the principally polarized beam in the first waveguide 22A from being coupled into the second waveguide 22B. Moreover, any principally polarized component propagating on the second waveguide 22B is excluded from the first waveguide 22A.

As shown in FIG. 7, a bend 42 in the second waveguide 22B brings a coupling portion 44B thereof into proximity with a coupling portion 44A of the first waveguide 22A. First and second gratings 46A–B are disposed within or above the coupling portions 44A–B of the first and second waveguides 22A–B respectively. Depending on the direction in which the coupled wave from the second waveguide 22B is intended to propagate, the gratings 46A–B can be long-period gratings or short-period gratings. In addition, any periodic structure suitable for coupling waves from one waveguide to another can be used in place of the gratings 46A–B. The structure and operation of gratings for coupling light between waveguides is fully discussed in "Fiber Grating Spectra" by Turan Erdogan, Journal of Lightwave Technology, Vol 15, No 8, August 1997, the contents of which are herein incorporated by reference.

In the embodiment shown in FIGS. 7–9 the waveguide structures are identical in cross-sectional size and construction so as to provide coupling in a forward propagating mode. The second grating 44B couples a forward propagating mode in the second waveguide 22B into a forward propagating mode within the substrate 10. The first grating 46A couples the forward propagating mode within the substrate 10 into the first waveguide 22A.

Figure 10:
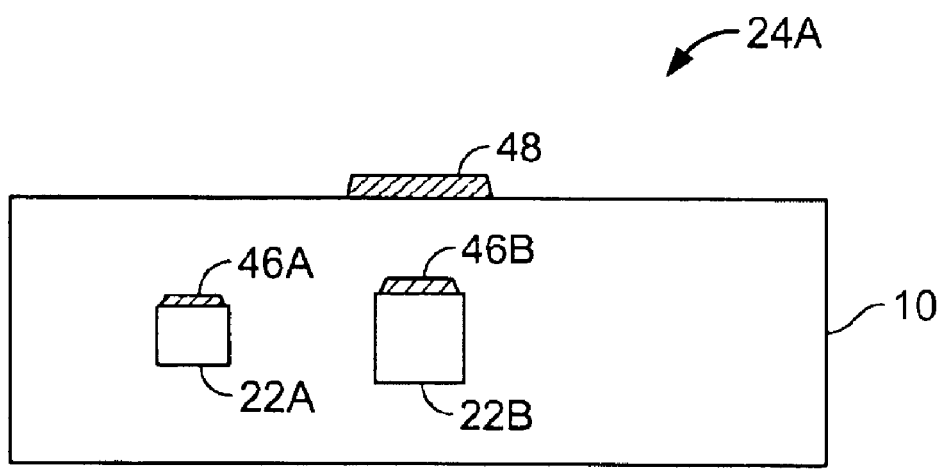
FIGS. 10–11 show alternative arrangements for a polarization coupler structure.

FIG. 10 shows an alternative embodiment, of a polarization coupler in which the first and second waveguides 22A–B have slightly different dimensions. In this case, an evanescent mode, rather than a forward propagating mode, is present in the substrate 10. An embodiment that relies on evanescent mode coupling across the gap between the two waveguides 22A–B can provide more efficient coupling than one that relies on the forward propagating mode because the waveguides 22A–B can be brought closer together without introducing significant broadband coupling between the two waveguide 22A–B.

Light is coupled from the second waveguide 22B into the first waveguide 22A only when the propagation constants on the first and second waveguides 22A–B match. Hence, to couple only the orthogonal polarization, the propagation constants for the principal polarization on the first and second waveguides 22A–B must be different.

As shown in FIGS. 8–9, a stress-applying strip 48 is placed on the surface 40 of the substrate 10 directly above the coupling region 44B of the second waveguide 22B shown in FIG. 7. The stress-applying strip 48 is made of a material having a coefficient of thermal expansion that is different from that of the underlying substrate 10. For example, if the substrate 10 is glass, the strip 48 can be silicon or metal. The material can be one having a high coefficient of thermal expansion, such as a metal, a glass composition having a high coefficient of thermal expansion, such as boron doped silica, or a polymer having a high coefficient of thermal expansion.

The strip 48 is deposited onto the surface 40 in a high-temperature process during which both the substrate 10 and the strip 48 are in an expanded state. When the substrate 10 and strip 48 cool, they contract by different amounts. Because the strip 48 is physically bonded to the substrate 10, these differences in coefficient of thermal expansion cause forces that result in a stress field in a neighborhood of the strip 48.

As shown in FIG. 9, the strip 48 is deposited proximate to, but not directly above, the first waveguide 22A, with the longitudinal direction of the strip 48 being parallel to the longitudinal axis of the first waveguide 22A. The first waveguide 22A is thus subjected to asymmetric transverse stresses. These asymmetric transverse stresses cause the material within the first waveguide 22A to become birefringent. The extent of this birefringence depends on the differences between the coefficients of thermal expansion of the substrate 10 and the strip 48, the position of the first waveguide 22A and the second waveguide 22B relative to the strip 48, and the positions of the first and second gratings 46A–B relative to the first and second waveguides 22A–B.

The second waveguide 22B, which is directly under the strip 48, is subjected only to symmetric transverse stresses. As a result, no birefringence is induced within the second waveguide 22B. The resulting difference between the propagation constants for the principal polarization in the second waveguide 22B and the first waveguide 22A prevents principally polarized modes from coupling from the first waveguide 22A into the second waveguide 22B. To the extent that propagation constants for the orthogonal mode remains the same, the orthogonally polarized mode is coupled from the second waveguide 22B into the first waveguide 22A.

As shown in FIG. 9, the strip 48 is directly above the second waveguide 22B. However, there can also be embodiments in which the strip 48 is disposed directly above the first waveguide 22A.

Figure 11:
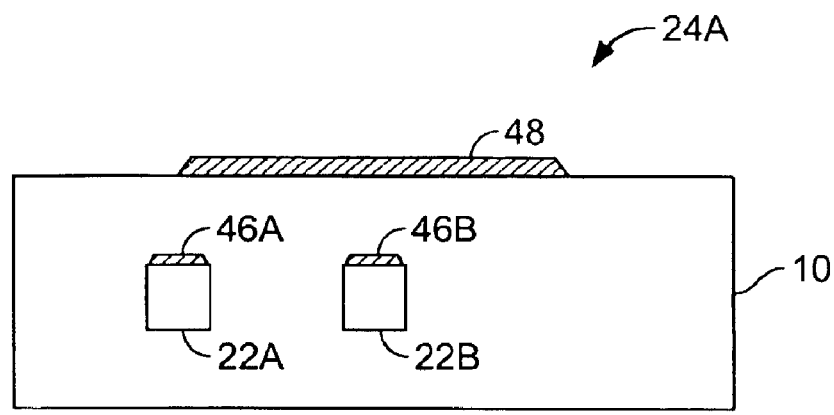

In addition, the embodiment shown in FIG. 9 has two gratings 46A–B, one above each of the waveguides 22A–B. However, a polarization coupler can also be made by providing a single grating that extends across both waveguides 22A–B, as illustrated in FIG. 11.

The structure described herein can also be used in reverse. In such an application, a principally polarized component and an orthogonally polarized mode propagate on the first waveguide 22A. Upon reaching the coupling region, the orthogonally polarized component is coupled into the second waveguide 22B while the principally polarized component continues through the first waveguide 22A.

In some embodiments of either the polarization rotator 26A or the polarization coupler 24A, the strip 38 can be a highly resistive material that expands in response to ohmic heating by an electrical current. In other embodiments, the strip 38 can be a piezo-electric material, in which case the strip 38 can be deformed in response to an applied voltage. Both these embodiments allow fine-tuning of the birefringence characteristic of the structure, either by varying the current or the voltage applied to the strip 38.

Figure 12:
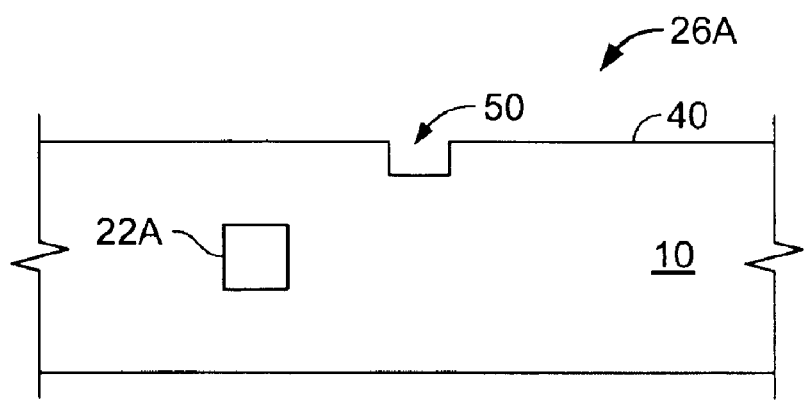
FIGS. 12–13 show alternative stress-inducing structures.
Figure 13:
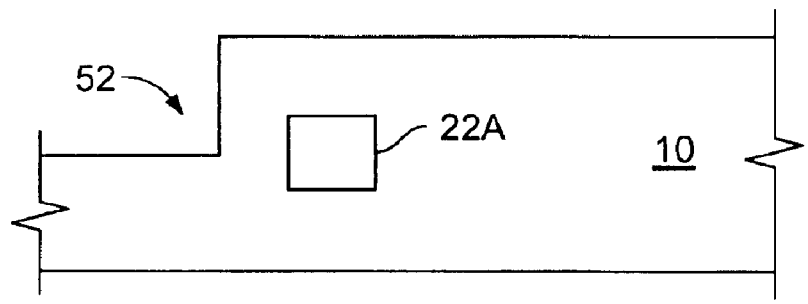

In either the polarization rotator 26A or the polarization coupler 24A, other stress-inducing structures can be used instead of the strip 38. For example, the top surface 40 of the substrate 10 can have walls forming a trench 50 transversely displaced from the first waveguide 22A as shown in FIG. 12, or walls forming a ledge 52 as shown in FIG. 13. The ledge 52 or trench 50 can be filled with a material, which may or may not have other structures embedded within it. In all these cases, the essential feature is that the principal axis of a birefringent portion 27A of the first waveguide 22A be rotated relative to the polarization vector of light provided by the laser 20A feeding that waveguide 22A. This is achieved by passing the waveguide 22A through a region of the substrate 10 in which the local stress field has rotated the principal axis of the material relative to this polarization vector.

A ledge 52 or trench 50 in the substrate 10 can be formed by depositing a mask to cover those areas of the substrate 10 that are not to be etched. The substrate 10 is then placed under tension or compression so as to cause a uniform stress field within the substrate 10. The substrate 10 is then etched, using known dry etching techniques, such as reactive ion etching or etching with an inductively coupled plasma, or using known wet etching techniques such as etching with HF. The presence of the ledge 52 or trench 50 creates a local perturbation the stress field, which causes the principal axis within the birefringent portion 27A to rotate. When a wave travels through a portion of a waveguide 22A that extends through the perturbed stress field, the polarization of that wave is rotated.

An initial uniform stress field within the substrate 10 can also be formed during fabrication of the waveguide 22A by heating the substrate 10, depositing a material thereon, and then cooling the substrate 10 and the deposited material. The deposited material can also be within the interior of the substrate 10 or it can be a film, such as a dielectric film, deposited on the surface of the substrate 10. To the extent that the substrate 10 and the deposited material have different coefficients of thermal expansion, there will be a stress field within substrate 10. Examples of materials include those that have a high coefficient of thermal expansion, for example metals, glass compositions having a high coefficient of thermal expansion, such as boron doped silica, or polymers having a high coefficient of thermal expansion. The formation of a trench 50 or ledge 52 will then locally perturb this stress field and thereby locally rotate the principal axis of the material through which the waveguide 22A is to pass.

A laser diode typically emits linearly polarized light. In some embodiments, the beams provided by the laser diodes 20A–H enter their respective waveguides 22A–H with their respective polarization vectors oriented in the same direction. In these embodiments, polarization rotators are used to rotate the polarization vectors of one laser diode 20A, C, E, G of each of the laser diode pairs 20A–B, 20C–D, 20E–F, 20G–H.

In other embodiments, no polarization rotator is necessary because the beams enter the substrate 10 with the desired polarizations. For example, if one laser diode 20A, C, E, G of each of the laser diode pairs 20A–B, 20C–D, 20E–F, 20G–H may be physically rotated ninety degrees relative to that of the other laser 20B, D, F, H in that pair. Or, a birefringent film can be placed in the path of the beam emitted by one laser 20B, D, F, H in each pair, for example where that beam enters the input coupling region 14. In either case, the polarizations of pairs of beams entering the input coupling region 14 are rotated relative to each other outside the substrate 10. In both these cases, the substrate 10 need not include any polarization rotators 26A.

One application of the optical multiplexers 8A–D as described herein is to provide a broadband polarization-independent pump beam for Raman amplification. In Raman amplification of a signal beam, a high intensity pump beam is made to propagate with the signal beam through a waveguide. The difference between the wavelengths of the pump beam and the signal beam is chosen such that energy is transferred from the pump beam to the signal beam, thus amplifying the signal beam.

A difficulty associated with Raman amplification is that the extent to which energy is transferred between the pump beam and the signal beam depends in part on the difference between their polarization states. Because the polarization state of the signal beam is unpredictable, the extent to which the signal beam is amplified is also unpredictable.

In the illustrated optical multiplexers 8A–D, the output waveguide 30 carries four pump beams, each at a different wavelength. Each pump beam has both a principally-polarized component and an orthogonally-polarized component. The resulting output beam of the optical multiplexers 8A–D is thus depolarized. As a result, even if the signal beam polarization is unknown, there will always be a component of the pump beam having a polarization state oriented to transfer some energy to the signal beam.

In some cases, a discontinuity may form in the optical system with which the optical multiplexer 8A–D is used. Such a discontinuity typically reflects light back toward the optical multiplexer 8A–D. It is therefore useful to detect such a reflection so that the laser diodes 20A–H can be shut down. To enable such detection, a multiplexer 8A can include an optional output tap 54 in optical communication with the first waveguide 22A. The output tap 54 is connected to a back-reflection detector (not shown) that is configured to immediately shut down the laser diodes 20A–H upon detection of a reflection.

The optical multiplexer 8A–D thus integrates polarization coupling and rotation into a single substrate 10. Optionally, the laser diodes 22A–H can themselves be grown on the substrate 10, thereby eliminating the need to provide for external optical coupling to the laser diodes 22A–H.

An optical multiplexer 8A–D as described herein has many applications other than those described above. For example, the multiplexer in addition to providing a depolarized multi-wavelength pump beam to a Raman amplifier, the optical multiplexer 8A–D can be a pump multiplexer of single or multiple wavelengths for erbium-doped fiber amplifiers. The optical multiplexer 8A–D can also be used to multiplex light having various polarizations in optical transportation systems, in test and measurement equipment, and in illumination and imaging systems.

Other embodiments are within the scope of the appended claims.

What is claimed is:

1. A polarization coupler comprising:
   a substrate;
   a stress-inducing feature disposed to generate a stress field in the substrate;
   a first waveguide having a first-waveguide coupling portion that passes through the stress field;

a second waveguide having a second-waveguide coupling portion that passes through the stress field;

a first-waveguide periodic-structure in optical communication with the first-waveguide coupling portion; and a second-waveguide periodic-structure in optical communication with the second-waveguide coupling portion.

2. The polarization coupler of claim 1, wherein the first-waveguide periodic-structure comprises a grating.

3. The polarization coupler of claim 2, wherein the grating comprises a long-period grating.

4. The polarization coupler of claim 2, wherein the grating comprises a short-period grating.

5. The polarization coupler of claim 1, wherein the first-waveguide periodic-structure and the second-waveguide periodic-structure are aligned with each other.

6. The polarization coupler of claim 1, wherein the first and second periodic-structures are offset from one another.

7. The polarization coupler of claim 1, wherein the first-waveguide periodic-structure and the second-waveguide periodic-structure are disposed to be in optical communication with each other.

8. The polarization coupler of claim 1, wherein the stress-inducing feature comprises a stress-inducing strip disposed on a surface of the substrate.

9. The polarization coupler of claim 8, wherein the stress-inducing strip is disposed above the first waveguide.

10. The polarization coupler of claim 1, wherein the stress-inducing feature is disposed above the first waveguide.

11. The polarization coupler of claim 8, wherein the stress-inducing strip extends across the first and second waveguides.

12. The polarization coupler of claim 8, wherein the stress-inducing strip is selected to have a thermal expansion coefficient that differs from a thermal expansion coefficient of the substrate.

13. The polarization coupler of claim 1, wherein the first waveguide has a first-waveguide cross-section, and the second waveguide has a second-waveguide cross-section that differs from the first-waveguide cross-section.

14. The polarization coupler of claim 1, wherein the first waveguide has a first-waveguide cross-section, and the second waveguide has a second-waveguide cross-section that has the same geometry as the first-waveguide cross-section.

15. The polarization coupler of claim 1, wherein the stress-inducing feature comprises a piezoelectric strip bonded to the substrate, the piezoelectric strip being configured to deform in response to an applied voltage, and to thereby selectively apply stress to the substrate.

16. The polarization coupler of claim 1, wherein the stress-inducing feature comprises a resistive strip bonded to the substrate, the resistive strip being configured to deform in response to heat generated by an applied current, and to thereby selectively apply stress to the substrate.

17. A method for combining a first light-wave having a first polarization and a second light-wave having a second polarization, the method comprising:

inducing a stress field in a substrate;

guiding the first light-wave through the stress field in a first waveguide, the first waveguide having a first-waveguide coupling-portion in optical communication with a first-waveguide periodic-structure;

guiding the second light-wave through the stress field in a second waveguide, the second waveguide having a second-waveguide coupling-portion in optical communication with a second-waveguide periodic-structure.

18. The method of claim 17, wherein inducing a stress-field comprises providing a stress-inducing strip on the substrate.

19. The method of claim 18, wherein inducing a stress-field further comprises forming the stress-inducing strip from a material having a thermal expansion coefficient that differs from a thermal expansion coefficient of the substrate.

20. The method of claim 17, further comprising providing a second waveguide having a second-waveguide cross-section that differs from a first-waveguide cross-section of the first waveguide.

21. The method of claim 17, further comprising providing a second waveguide having a second-waveguide cross-section that has the same geometry as a first-waveguide cross-section of the first waveguide.

22. The method of claim 18, wherein providing a stress-inducing strip comprises disposing the stress-inducing strip on the substrate above one of the first-waveguide coupling-portion and the second waveguide-coupling portion.

23. The method of claim 17, wherein inducing a stress field in the substrate comprises providing a piezoelectric strip bonded to the substrate, the piezoelectric strip being configured to deform in response to an applied voltage, and to thereby selectively apply stress to the substrate.

24. The method of claim 17, wherein inducing a stress field in the substrate comprises providing a resistive strip bonded to the substrate, the resistive strip being configured to deform in response to heat generated by an applied current, and to thereby selectively apply stress to the substrate.

25. An integrated optical circuit comprising:

a substrate having a birefringent portion;

a first waveguide having a first-waveguide coupling-portion that passes through the birefringent portion;

a first-waveguide periodic-structure in optical communication with the first-waveguide coupling-portion;

a second waveguide having a second-waveguide coupling-portion that passes through the birefringent portion; and a second-waveguide periodic-structure in optical communication with the second-waveguide coupling-portion.

* * * * *

UNITED STATES PATENT AND TRADEMARK OFFICE
CERTIFICATE OF CORRECTION

PATENT NO. : 6,947,639 B2
APPLICATION NO. : 10/298465
DATED : September 20, 2005
INVENTOR(S) : Harmeet Singh and Hamid R. Khazaei It is certified that error appears in the above-identified patent and that said Letters Patent is hereby corrected as shown below:

<u>Title page,</u>
Item [73], Assignee, should read -- Optovia Corporation, Acton, MA (US) --.

Signed and Sealed this

Fourth Day of July, 2006

JON W. DUDAS
*Director of the United States Patent and Trademark Office*